Nov. 19, 1957    K. PILARCZYK    2,813,761
THRUST BEARING
Filed Feb. 2, 1955
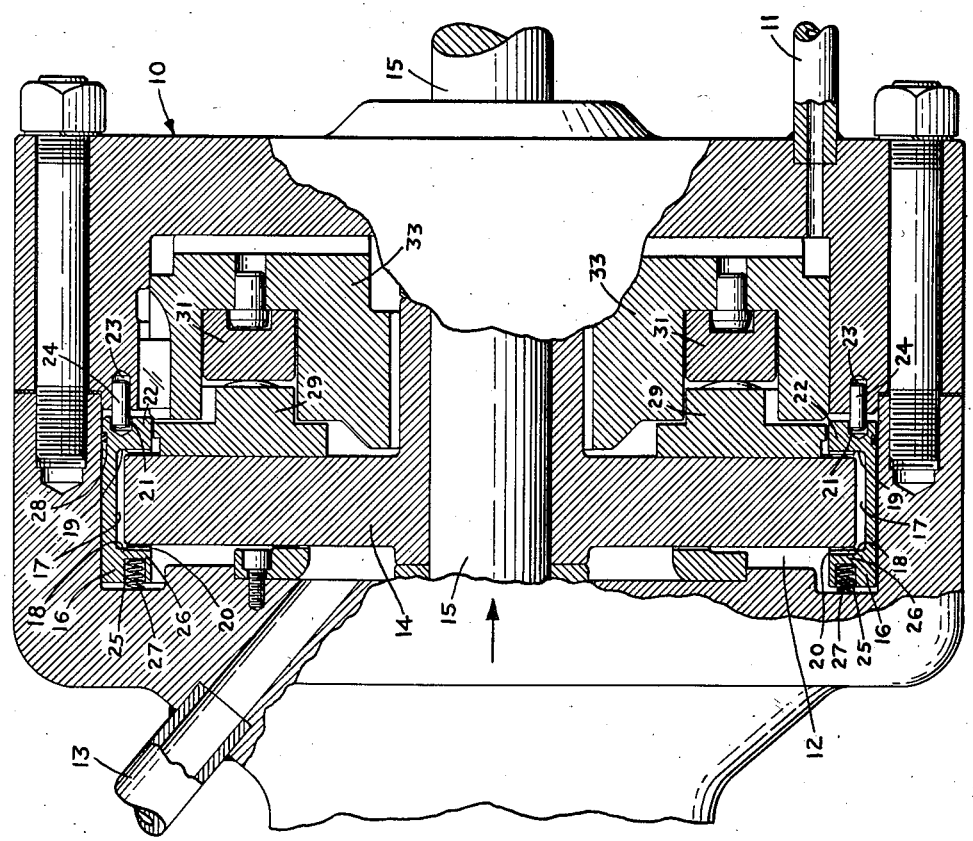
KAROL PILARCZYK
*INVENTOR.*
BY Daniel W. Bobis
*atty*

United States Patent Office 2,813,761
Patented Nov. 19, 1957

2,813,761

THRUST BEARING

Karol Pilarczyk, East Orange, N. J., assignor to Worthington Corporation, Harrison, N. J., a corporation of Delaware Application February 2, 1955, Serial No. 485,663

9 Claims. (Cl. 308—9)

The present invention relates to a thrust bearing and more particularly to novel means for relieving the static load on a thrust bearing upon initially rotating the apparatus on which the bearing is arranged.

In a thrust bearing for a rotatable shaft, wherein an unbalanced axial load is transmitted from the shaft to the bearing through a collar fixed on the shaft, the static load on the bearing frequently exceeds the dynamic load developed once the shaft is rotated. Since the bearing is generally designed for the dynamic load thereon, the bearing may be permanently damaged unless means are provided to compensate for this initial excessive load on the bearing. Accordingly, it is common practice to provide balancing disks, hydraulic disks, or the like, to compensate for this load and provide relief for the bearing when the shaft is initially rotated. In many instances when the static load or thrust is only moderately higher than the normal dynamic load on the bearing, a larger thrust bearing than required for normal dynamic operation is selected.

However, these methods have not proved entirely satisfactory either because the additional expense involved outweighs the useful period of service of the compensating device, or the devices are space consuming and influence to a considerable degree the design of the rotating parts of the apparatus, with respect to the critical or operating speed thereof.

In accordance with the present invention, a novel means is provided for relieving the static load on the bearing which means is both simple and inexpensive and which will not influence the design of the bearing for a particular critical speed. The static load relieving means of the present invention comprises a thrust collar fixed to a rotatable shaft and positioned within a conventional thrust bearing housing. An inlet and outlet are provided in the housing for flowing lubricating liquid under pressure therethrough. Sealing means are disposed in the bearing housing adjacent the inlet side of the collar for axial movement therein to provide a seal between the collar and housing when the pressure of the lubricating liquid passed into the housing exceeds a predetermined value to expose the total collar area to the high pressure action of the oil to oppose the unbalanced axial force or static load on the shaft and prevent permanent damage to the bearing. Tension means are provided to move the sealing means axially in one direction to form a passageway between the sealing means and collar when the pressure of the lubricating liquid flowed through the housing decreases below a predetermined value for the passage of lubricating liquid therethrough.

The invention will be better understood from the following description when considered in connection with the accompanying drawing forming a part thereof. The drawing is a side elevational view of a thrust bearing, partly broken away, embodying the present invention.

Referring to the drawing, the reference numeral 10 designates the housing of a thrust bearing having an inlet connection 11 in one end thereof through which lubricating liquid is passed to the housing chamber 12, from a source not shown, and an outlet connection 13 in the opposite end thereof for flowing liquid therefrom. A thrust collar 14 is disposed in chamber 12 fixed on a shaft 15 extending therethrough and rotated by means not shown. A sealing ring 16 having a peripheral groove 17 on the inner surface thereof is disposed in chamber 12 and arranged on collar 14 with the outer periphery thereof extending into the groove. Ring 16 is preferably of split construction held together by well known means not shown. The distance between opposite side walls or faces 18 and 19 of groove 17 is greater than the thickness of collar 14 and the diameter of groove 17 is substantially greater than the diameter of collar 14 to allow axial and radial movement of collar 14 with respect to the ring. Side wall 18 is provided with a plurality of radial slots 20 coextensive therewith to permit the flow of the normal quantity of oil required for lubrication of the bearing therethrough, as hereinafter described. Both side walls are coated with bearing material such as babbitt.

Ring 16 is provided with axially extending bores 21 in ring portion 22 adjacent groove sidewall 19 and in alignment with axially extending bores 23 in housing 10. Pins 24 are slidably disposed in bores 21 and 23 to prevent rotation of the ring in the housing while permitting axial movement therein, as hereinafter described. A plurality of axially extending bores 25 are disposed in ring portion 26 adjacent groove side wall 18 and are provided with tension springs 27 therein which maintain groove side wall 18 in contact with one side of collar 14 when the pressure of lubricating liquid flowing through the housing is less than the force exerted by spring 27 against the bottom of bore 25. A rubber sealing gasket or ring 28 inserted in a circumferential recess in the outer periphery of ring 16 prevents lubricating liquid from escaping through any clearance between the ring and inner periphery of housing 10.

Bearing segments or shoes 29 are positioned in the housing on one side of collar 14 adjacent ring portion 22 and support the axial load transmitted therethrough from shaft 15. Shoes 29 are tiltably mounted on equalizing base rings 31 mounted in channel-shaped spacing rings 33 bearing against the end wall of the housing.

During normal operation of the thrust bearing, when shaft 15 is rotating and there is a dynamic axial load on the bearing, tension springs 27 maintain ring portion 26 in contact with collar 14 and ring portion 22 in spaced relationship therewith. A lubricating liquid, for example oil, at 10 to 15 pounds per square inch gage is supplied to chamber 12 through inlet 11 from a source not shown. The oil flows therein into contact with the bearing shoes, base rings, spacing rings, and collar disposed in the housing, thereafter flowing through the clearance between groove side wall 19 and the inner face of ring portion 22 and around the outer periphery of collar 14. Thereafter, the oil flows through slots 20 and into outlet connection 13 through which it is discharged from the bearing housing.

When it is desired to relieve the thrust or static load on shaft 15 exerted in the direction indicated by the arrow in the drawing, the lubricating oil is introduced into chamber 12 under a pressure sufficient to provide a force acting on portion 22 of ring 16 greater than the force in tension springs 27. Since liquids exert a pressure in all directions, the oil pressure exerts a pressure in every direction in the chamber and causes ring 16 to move axially therein to the left in the drawing, until ring portion 22 contacts the side of collar 14 and provides a seal therebetween. Ring portion 22 is moved against collar 14 because the force acting against the outer face of portion 22 is greater than the force acting on side wall 19 of recess 17 because the total area of the face of portion 22 is larger than the area of side wall 19, and force is equal to the product of the pressure and area on which it acts. Thus, ring 16 provides a seal between the collar and housing and thereby exposes the entire side of collar 14 to the high pressure action of the oil. The oil pressure then acts on the collar to provide a relief thrust or force which opposes the static load on shaft 15 and is equal to the product of the effective collar area and the oil pressure. For example, assume that the static load or axial thrust on shaft 15 is 40,000 lbs. at starting, and the effective area of thrust collar 14 is 187 sq. in. Then the required thrust reduction or relief for 40,000 lbs. is obtained by introducing oil at 214 pounds per square inch gage into the chamber through inlet connection 11. Thus the present invention provides novel means to relieve static load on the bearing when initially starting the apparatus to prevent permanent damage to the bearing.

It will be understood that the invention is not to be limited to the specific construction or arrangement of parts shown, but that they may be widely modified within the invention defined by the claims.

What is claimed is:

1. In a thrust bearing for a rotatable shaft wherein an axial load is transmitted to a bearing through a collar fixed to a shaft and the collar and bearing are disposed in a housing having an inlet and outlet on opposite sides of the collar for receiving and discharging lubricating liquid under pressure therethrough, the combination with said collar of sealing means disposed in the housing for axial movement therein to provide a seal between the collar and housing when the pressure of the lubricating liquid increases above a predetermined value against the said sealing means, and tension means adapted to move said sealing means to provide a passageway between the collar and housing when the pressure of the lubricating liquid decreases below a predetermined value.

2. The thrust bearing of claim 1 wherein the sealing means comprises a ring positioned adjacent the inlet side of the collar with the outer periphery thereof in contact with the inner periphery of the housing.

3. In a thrust bearing for a rotatable shaft wherein the axial load is transmitted to a bearing through a collar fixed to a shaft and the collar and bearing are disposed in a housing having an inlet and outlet on opposite sides of the collar for receiving and discharging lubricating liquid under pressure, a sealing ring disposed in said housing for axial movement therein, said ring having its outer diameter in abutting relationship with the inner periphery of the housing and its inner diameter extending inwardly of the outer periphery of said collar to form a seal between the collar and housing when the pressure of the lubricating liquid increases above a predetermined value against an outer surface of the said sealing ring nearest the housing inlet, and tension means adapted to move said ring axially to provide a passageway between said collar and housing when the pressure of the lubricating liquid decreases below a predetermined value.

4. In a thrust bearing for a rotatable shaft wherein an axial load is transmitted to a bearing through a collar fixed to a shaft and the collar and bearing are disposed in a housing having an inlet and outlet on opposite sides of the collar for receiving and discharging lubricating liquid under pressure, the combination with said collar of a sealing ring positioned in said housing for axial movement therein with its outer diameter abutting the inner periphery of the housing, said sealing ring having a peripheral groove on the inner surface thereof, said collar being adapted to extend into said groove, passage means in communication with said groove and outlet, and tension means for maintaining one side wall of said groove in contact with one side of said collar and the other side wall of said groove out of contact with the other side of said collar to form a passageway therebetween when the pressure of said lubricating liquid decreases below a predetermined value against an outer surface of the said sealing ring nearest the housing inlet.

5. In a thrust bearing for a rotatable shaft wherein an axial load is transmitted to a bearing through a collar fixed to a shaft and the collar and bearing are disposed in a housing having an inlet and outlet on opposite sides of the collar for receiving and discharging lubricating liquid under pressure, the combination with said collar of a sealing ring positioned in said housing for axial movement therein with its outer diameter abutting the inner periphery of the housing, said sealing ring having a peripheral groove on the inner surface thereof, said collar being adapted to extend into said groove, a plurality of radially extending passages disposed in a side wall formed by said groove, means for preventing said sealing ring from rotating, and tension means for maintaining said side wall in contact with one side of said collar adjacent thereto and the opposite side of said groove out of contact with the opposite side of said collar to form a passageway therebetween when the pressure of said lubricating liquid decreases below a predetermined value against an outer surface of the said sealing ring nearest the housing inlet.

6. In a thrust bearing for a rotatable shaft wherein an axial load is transmitted to a bearing through a collar fixed to a shaft and the collar and bearing are disposed in a housing having an inlet and outlet on opposite sides of said collar for receiving and discharging lubricating liquid under pressure, the combination with said collar of a sealing ring positioned in said housing for axial movement therein with its outer diameter abutting the inner periphery of the housing, said sealing ring having a peripheral groove on the inner surface thereof, said collar being adapted to extend into said groove, a plurality of radially extending passages disposed in a side wall formed by said groove, pin means for preventing said sealing ring from rotating, and tension means extending into the ring adjacent the outlet end of the housing for maintaining said side wall in contact with the one side of said collar and the opposite side of said groove out of contact with the opposite side of said collar to form a passageway therebetween when the pressure of said lubricating liquid decreases below a predetermined value against an outer surface of the said sealing ring nearest the housing inlet.

7. In a thrust bearing for a rotatable shaft wherein an axial load is transmitted to a bearing through a collar fixed to a shaft and the collar and bearing are disposed in a housing having an inlet and outlet on opposite sides of said collar for receiving and discharging lubricating liquid under pressure, the combination with said collar of a sealing ring disposed in said housing for axial movement therein with its outer diameter abutting the inner periphery of the housing, said ring having a peripheral groove on the inner surface thereof, said groove being wider than the thickness of said collar, said collar being positioned in the housing with the periphery thereof extending into said groove, said groove having a plurality of radial slots in one side wall thereof in communication with said groove and said outlet, and tension means adapted to maintain said one side wall in abutting relationship with the one side of said collar and the opposite side of said groove out of contact with the opposite side of said collar to form a passageway therebetween when the pressure of said lubricating liquid decreases below a predetermined value against an outer surface of the said sealing ring nearest the housing inlet.

8. In a thrust bearing for a rotatable shaft wherein an axial load is transmitted to a bearing through a collar fixed to a shaft and the collar and bearing are disposed in a housing having an inlet and outlet on opposite sides of said collar for receiving and discharging liquid under pressure, the combination with said collar of a sealing ring disposed in said housing for axial movement therein with its outer diameter abutting the inner periphery of the housing, said ring having a peripheral groove on the inner surface thereof, said groove being wider than the thickness of said collar, said collar being positioned in the housing with the periphery thereof extending into said groove, axially extending pin means connected to the ring for preventing rotation of the ring in the housing, said groove having a plurality of radial slots in one side wall thereof in communication with the groove and said housing outlet, and axially extending tension means adapted to maintain said one side wall in abutting relationship with one side of said collar and the other side wall of the groove out of contact with the other side of the collar to form a passageway therebetween when the pressure of said lubricating liquid decreases below a predetermined value against an outer surface of the said sealing ring nearest the housing inlet.

9. In a thrust bearing for a rotatable shaft wherein an axial load is transmitted to a bearing through a collar fixed to a shaft and the collar and bearing are disposed in a housing having an inlet and outlet on opposite sides of said collar for receiving and discharging lubrication liquid, the combination with said collar of a sealing ring disposed in said housing with its outer diameter abutting the inner periphery of the housing, said ring having a peripheral groove on the inner surface thereof, said groove being wider than the thickness of said collar, said collar being positioned in the housing with the periphery thereof extending into said groove, a plurality of pins slidably disposed in axially aligned openings in the housing and ring for preventing rotation of the ring in the housing, said groove having a plurality of radial slots in one side wall thereof and extending from the inner surface of the ring to the bottom of the groove, means for connecting said inlet with a source of lubricating liquid under pressure, and springs adapted to maintain said one side wall in abutting relationship with one side of said collar when the pressure of said lubricating decreases below a predetermined value against an outer surface of the said sealing ring nearest the housing inlet.

References Cited in the file of this patent
UNITED STATES PATENTS
624,497    Ingus _____ May 9, 1899